(12) United States Patent
O'Sullivan et al.

(10) Patent No.: US 10,148,077 B2
(45) Date of Patent: Dec. 4, 2018

(54) SEALING SYSTEMS AND METHODS FOR ELONGATE MEMBERS

(71) Applicant: Tyco Electronics Corporation, Berwyn, PA (US)

(72) Inventors: Edward O'Sullivan, Cary, NC (US); Mahmoud Seraj, Apex, NC (US); Senthil Asokkumar, Morrisville, NC (US)

(73) Assignee: TE Connectivity Corporation, Berwyn, PA (US)

( * ) Notice: Subject to any disclaimer, the term of this patent is extended or adjusted under 35 U.S.C. 154(b) by 112 days.

(21) Appl. No.: 14/676,448

(22) Filed: Apr. 1, 2015

(65) Prior Publication Data

US 2015/0288164 A1    Oct. 8, 2015

Related U.S. Application Data

(60) Provisional application No. 61/976,823, filed on Apr. 8, 2014.

(51) Int. Cl.
    *H02G 15/04*    (2006.01)
    *H02G 15/18*    (2006.01)
    (Continued)

(52) U.S. Cl.
    CPC ......... *H02G 15/04* (2013.01); *H02G 15/046* (2013.01); *H02G 15/182* (2013.01);
    (Continued)

(58) Field of Classification Search
    CPC .... H02G 15/04; H02G 15/13; H02G 15/1833; H02G 15/00; H02G 15/013; H02G 15/02;
    (Continued)

(56) References Cited

U.S. PATENT DOCUMENTS 4,194,750 A * 3/1980 Sovish ............... F16L 5/02
                                                    174/77 R
4,501,927 A * 2/1985 Sievert ............ H02G 15/192
                                                       156/49

(Continued)

FOREIGN PATENT DOCUMENTS

ES       2020858       10/1991

OTHER PUBLICATIONS

Notification Concerning Transmittal of International Preliminary Report on Patentability in corresponding PCT Application No. PCT/IB2015/052446 dated Oct. 20, 2016 (7 pages).

(Continued)

*Primary Examiner* — Steven T Sawyer
*Assistant Examiner* — Paresh H Paghadal
(74) *Attorney, Agent, or Firm* — Myers Bigel, P.A.

(57) ABSTRACT

A sealing system for forming an environmentally sealed joint with an elongate member includes a tubular substrate, a pre-expanded cover unit, and a flowable sealant. The tubular substrate includes an integral guide feature and defines a substrate bore to receive a portion of the elongate member. The pre-expanded cover unit includes a holdout and a tubular cover sleeve. The holdout includes a helically wound strip forming a tubular holdout body and a rip cord. The holdout body defines a holdout passage extending axially therethrough. The tubular cover sleeve is mounted on the holdout body. The holdout maintains the cover sleeve in a radially elastically expanded state. With the elongate member positioned with a portion thereof extending from the tubular substrate and a layer of the sealant mounted on an outer surface of the tubular substrate and/or on an outer surface of the elongate member, the pre-expandable unit can be mounted around the layer of sealant and the holdout can then be removed from the cover sleeve by withdrawing the (Continued)

rip cord through the holdout passage between the layer of the sealant and the holdout body to remove the holdout body and thereby permit the cover sleeve to radially contract about the tubular substrate and the elongate member, and the guide feature serves to prevent or inhibit the rip cord from contacting the layer of the sealant as the rip cord is withdrawn through the holdout passage.

13 Claims, 7 Drawing Sheets

(51) Int. Cl.
*H02G 15/00* (2006.01)
*H02G 15/02* (2006.01)
*H02G 15/013* (2006.01)

(52) U.S. Cl.
CPC ..... *H02G 15/1806* (2013.01); *H02G 15/1813* (2013.01); *H02G 15/00* (2013.01); *H02G 15/013* (2013.01); *H02G 15/02* (2013.01); *H02G 15/1833* (2013.01)

(58) Field of Classification Search
CPC ............... H02G 15/043; H02G 15/046; H02G 15/1806; H02G 15/1813; H02G 15/182; H02G 15/1826
See application file for complete search history.

(56) References Cited

U.S. PATENT DOCUMENTS

| | | | | |
|---|---|---|---|---|
| 4,983,784 | A * | 1/1991 | Whitlock | F16L 5/06 174/652 |
| 5,670,223 | A | 9/1997 | Sadlo et al. | |
| 5,753,861 | A * | 5/1998 | Hansen | H01R 4/70 174/136 |
| 5,925,427 | A | 7/1999 | Sadlo et al. | |
| 5,944,929 | A | 8/1999 | Vallauri et al. | |
| 8,889,989 | B2 | 11/2014 | Maher | |
| 2010/0279542 | A1* | 11/2010 | Seraj | H01R 4/72 439/502 |
| 2011/0180323 | A1* | 7/2011 | Luzzi | H01R 4/01 174/84 R |
| 2013/0164475 | A1* | 6/2013 | Rivard | B32B 1/08 428/36.91 |
| 2014/0151084 | A1* | 6/2014 | Spalding | H01B 3/30 174/120 SR |
| 2015/0287497 | A1* | 10/2015 | Shiga | B60R 16/0215 174/84 R |

OTHER PUBLICATIONS

Notification of Transmittal of the International Search Report and the Written Opinion of the International Searching Authority, or the Declaration, in corresponding PCT Application No. PCT/IB2015/052446 dated Jun. 22, 2015 (9 pages).

ELB-600-CES Product Installation Instructions, TE Connectivity, Apr. 23, 2012, 4 pages.

* cited by examiner

SEALING SYSTEMS AND METHODS FOR ELONGATE MEMBERS

RELATED APPLICATIONS

The present application claims the benefit of and priority from U.S. Provisional Patent Application No. 61/976,823, filed Apr. 8, 2014, the disclosure of which is incorporated herein by reference in its entirety.

FIELD OF THE INVENTION

The present invention relates to sealing arrangements for elongate members such as electrical cables and, more particularly, to methods and systems for sealing protective covers about elongate members such as electrical cables.

BACKGROUND OF THE INVENTION

In the electrical utilities industry, maintaining cable integrity may be critical. A loss of cable integrity, for example, a short circuit in a high voltage cable, may result in a crippling power outage or, even worse, a loss of life. One everyday task that may pose a great threat to cable integrity is the formation of electrical connections.

When electrical connections are formed, a bare metal surface may be exposed such as a splice connector. These bare metal surfaces may be particularly hazardous when formed in the field where they are exposed to the environment. This environment may include rocks and other sharp objects as well as moisture when the connection is to be buried under ground and rainfall when the connection is to be suspended in the air. Thus, there is a need to protect such electrical connections from the environment.

It is a known practice in the electrical utilities industry to use mastic sealant tape as a substrate for EPDM seal tubes as part of cable preparation prior to collapsing the cold applied EPDM seal via a spiral holdout. Mastic seals discontinuities on the surface of the cable and joint and also serves as a better adhesive for the EPDM tube to adhere. However, some installation issues may occur with the use of spiral holdouts in that the rip cord of the spiral holdout damages the mastic bead as the installer unravels it to apply the EPDM seal tube. That is, the rip cord itself comes in contact with the mastic, which in turn adheres to the rip cord, and then the mastic gets removed from surface, which compromises the seal.

Some known solutions to this problem involve the use of electrical tape. Electrical tape is applied to the mastic in an attempt to protect the surface of the mastic and prevent the rip cord of the spiral holdout from contacting the mastic outer surface, thus aiding the subsequent installation of the EPDM tube. In practice however, the electrical tape covers a portion of the mastic prohibiting the adhesion of the entire width of the mastic to the EPDM seal tube, decreasing the effective seal of the mastic-EPDM interface. Furthermore, the installer often has to determine how much of the electrical tape to use to prevent the spiral holdout from contacting the mastic. Additionally, if too much tension is applied to the electrical tape, it displaces (squeezes) the mastic and creates another mastic catch point for the rip cord at the trail edge of the electrical tape.

SUMMARY

According to embodiments of the invention, a sealing system for forming an environmentally sealed joint with an elongate member includes a tubular substrate, a pre-expanded cover unit, and a flowable sealant. The tubular substrate includes an integral guide feature and defines a substrate bore to receive a portion of the elongate member. The pre-expanded cover unit includes a holdout and a tubular cover sleeve. The holdout includes a helically wound strip forming a tubular holdout body and a rip cord. The holdout body defines a holdout passage extending axially therethrough. The tubular cover sleeve is mounted on the holdout body. The holdout maintains the cover sleeve in a radially elastically expanded state. With the elongate member positioned with a portion thereof extending from the tubular substrate and a layer of the sealant mounted on an outer surface of the tubular substrate and/or on an outer surface of the elongate member, the pre-expandable unit can be mounted around the layer of sealant and the holdout can then be removed from the cover sleeve by withdrawing the rip cord through the holdout passage between the layer of the sealant and the holdout body to remove the holdout body and thereby permit the cover sleeve to radially contract about the tubular substrate and the elongate member, and the guide feature serves to prevent or inhibit the rip cord from contacting the layer of the sealant as the rip cord is withdrawn through the holdout passage.

According to method embodiments of the invention, a method for forming an environmentally sealed joint with an elongate member includes providing a tubular substrate including an integral guide feature and defining a substrate bore to receive a portion of the elongate member. The method further includes providing a pre-expanded cover unit including: a holdout including a helically wound strip forming a tubular holdout body and a rip cord, the holdout body defining a holdout passage extending axially therethrough; and a tubular cover sleeve mounted on the holdout body, wherein the holdout maintains the cover sleeve in a radially elastically expanded state. The method further includes: positioning the elongate member in the tubular substrate such that a portion of the elongate member extends from the tubular substrate; mounting a layer of a flowable sealant on an outer surface of the tubular substrate and/or on an outer surface of the elongate member; mounting the pre-expandable unit around the layer of sealant; and thereafter removing the holdout from the cover sleeve by withdrawing the rip cord through the holdout passage between the layer of the sealant and the holdout body to remove the holdout body and thereby permit the cover sleeve to radially contract about the tubular substrate and the elongate member, wherein the guide feature serves to prevent or inhibit the rip cord from contacting the layer of the sealant as the rip cord is withdrawn through the holdout passage.

Further features, advantages and details of the present invention will be appreciated by those of ordinary skill in the art from a reading of the figures and the detailed description of the embodiments that follow, such description being merely illustrative of the present invention.

DETAILED DESCRIPTION OF EMBODIMENTS OF THE INVENTION

Figure 1:
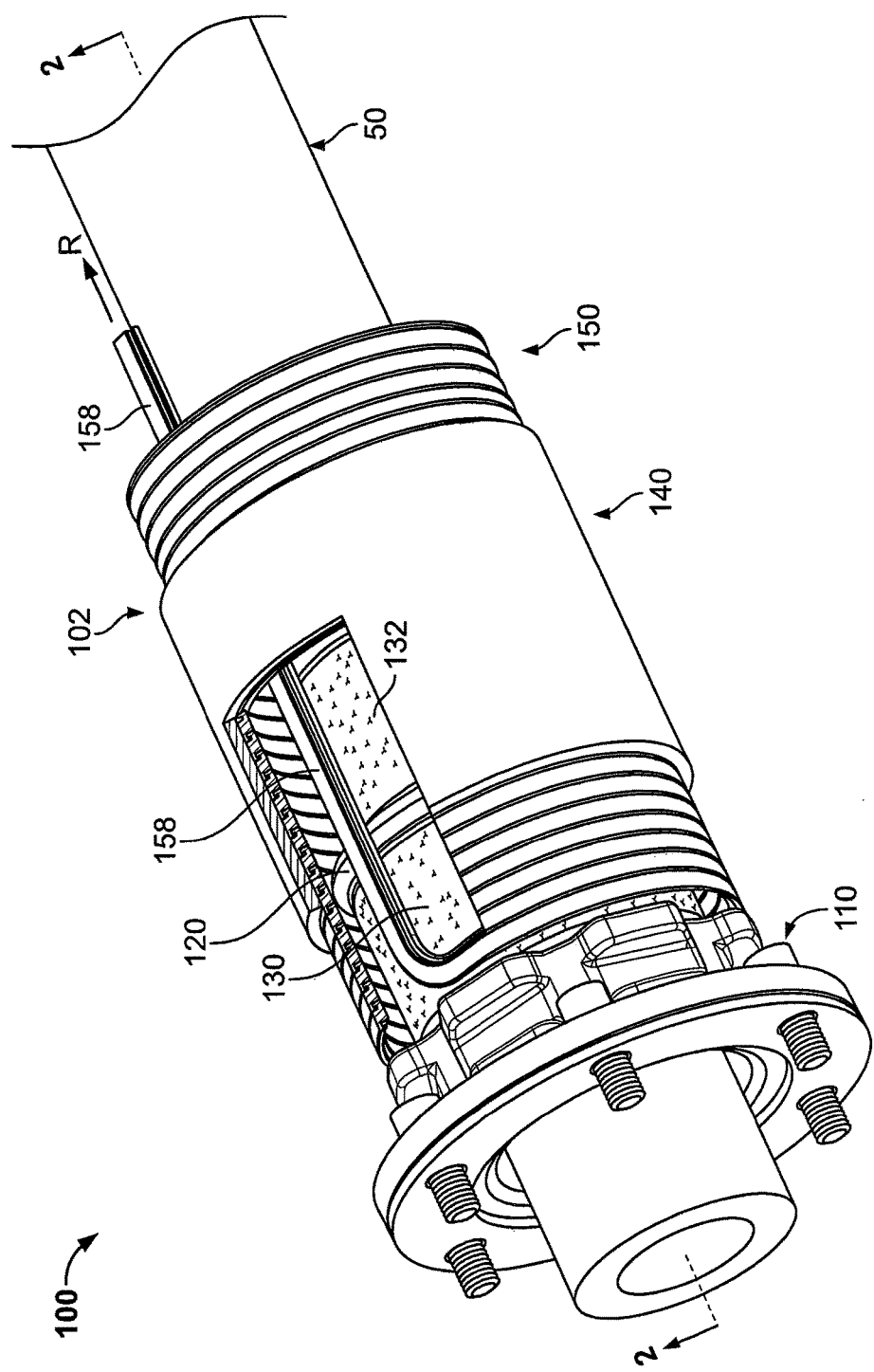
FIG. 1 is a front perspective view of a sealing system according to embodiments of the invention, wherein a protective cover sleeve is in position to be displayed from a holdout.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

As used herein, "cold-applied" or "cold-applied cover" means that the cover or component can be assembled or installed about a substrate (e.g., a cable) without requiring the use of applied heat at the time of installation.

As used herein, "cold shrink" or "cold shrink cover" means that the cover or component can be shrunk or contracted about a substrate (e.g., a cable) without requiring the use of applied heat.

As used herein, "monolithic" means an object that is a single, unitary piece formed or composed of a material without joints or seams.

With reference to FIGS. 1-6, a sealing system 100 according to some embodiments of the present invention is shown therein. The sealing system 100 includes a tubular substrate 110, a mass of primary sealant 130, a mass of secondary sealant 132, and a pre-expanded cover unit 102. The pre-expanded cover unit 102 includes a holdout 150 and a protective cover tube or sleeve 140 mounted on the holdout 150 in a radially elastically pre-expanded state or position. In some embodiments and as illustrated, the tubular substrate 110 (hereinafter referred to as the coupler fitting 110) is a mining coupler fitting. However, as discussed below, other types and configurations of tubular substrates may be provided in accordance with other embodiments of the invention.

Figure 3:
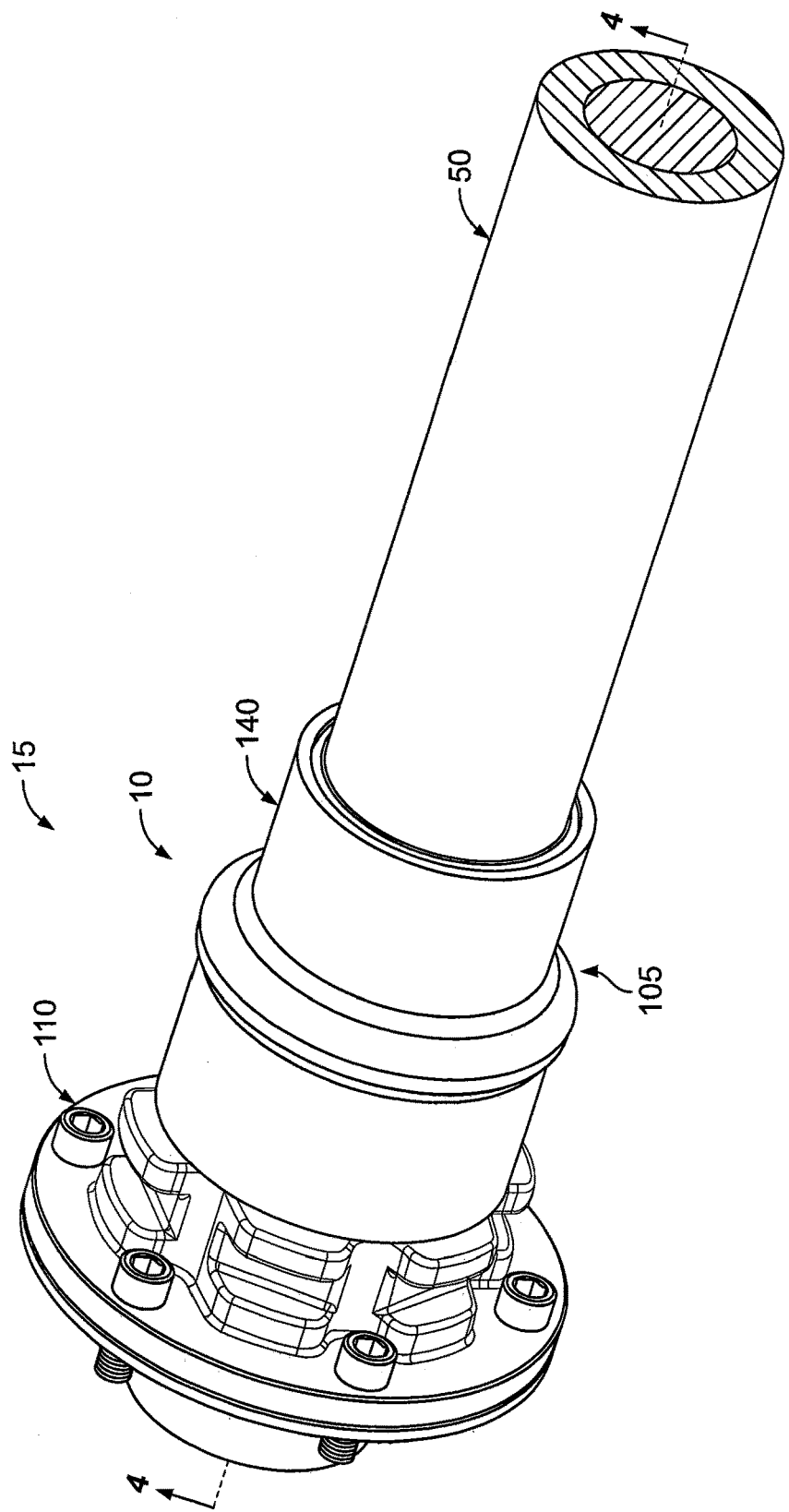
FIG. 3 is a rear perspective view of a coupling assembly including the sealing system of FIG. 1 fully installed.
Figure 4:
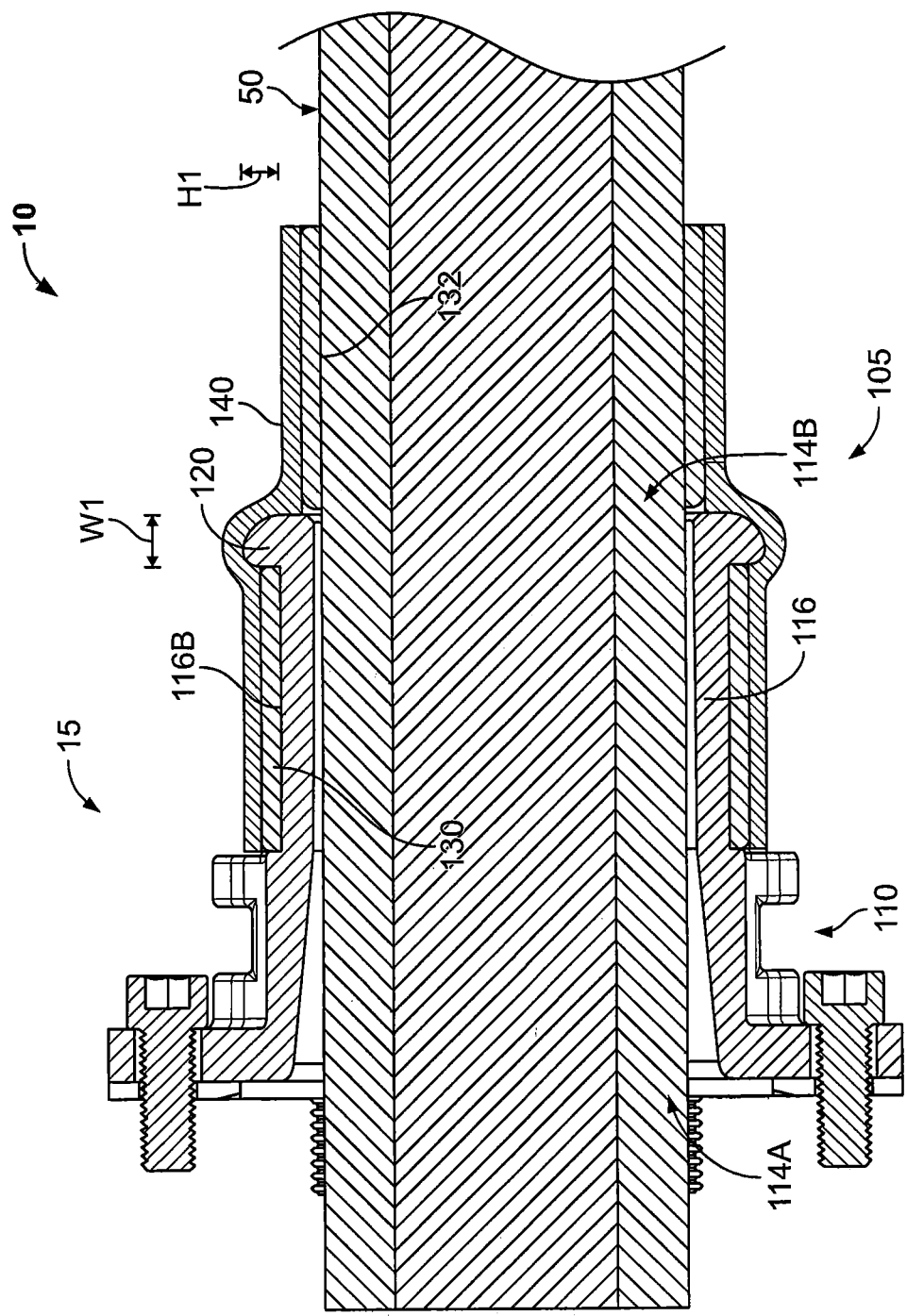
FIG. 4 is a cross-sectional view of the coupling assembly of FIG. 3 taken along the line 4-4 of FIG. 3.
Figure 5:
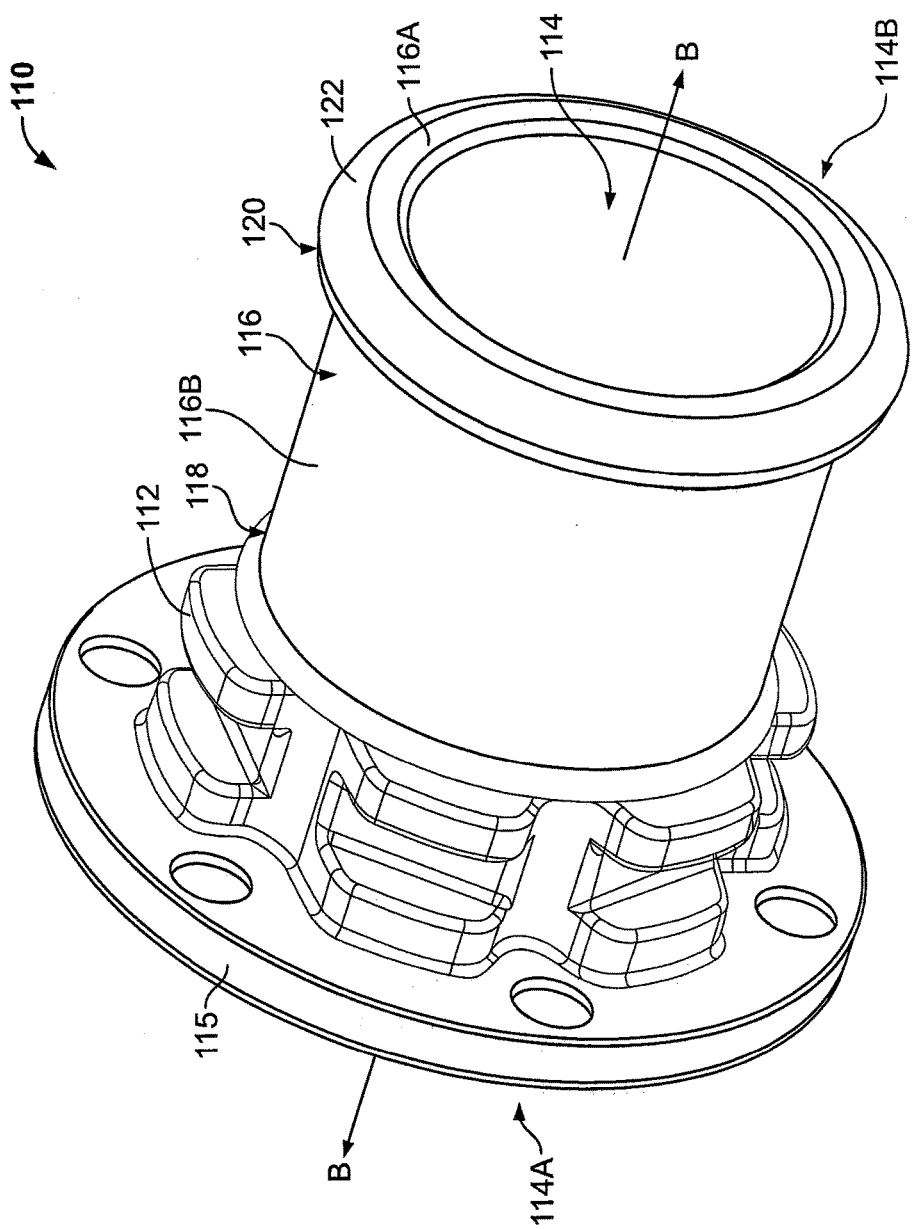
FIG. 5 is a rear perspective view of a coupler fitting forming a part of the coupling assembly of FIG. 3 and including a guide flange forming a part of the sealing system of FIG. 1.
Figure 6:
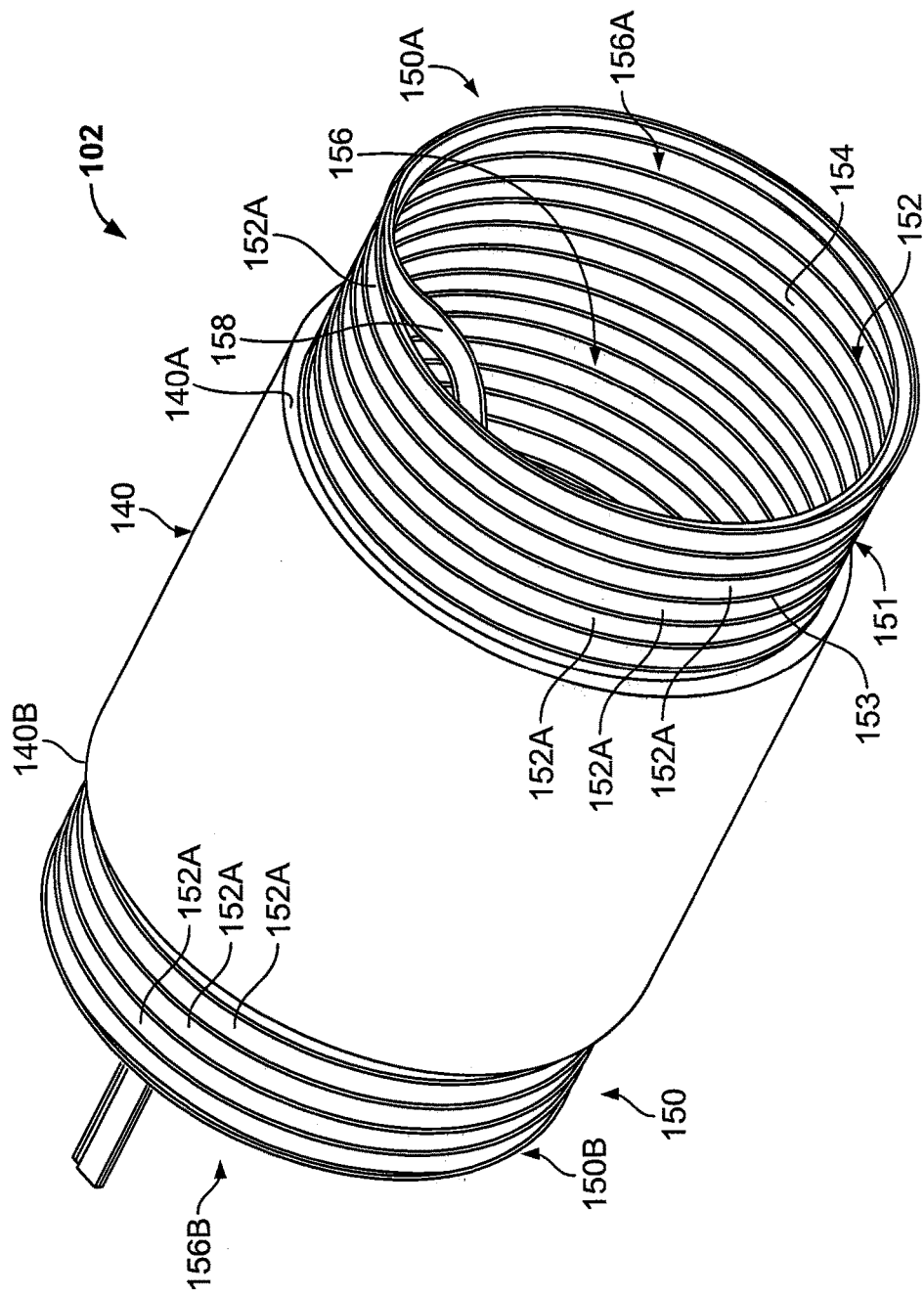
FIG. 6 is a front perspective view of a pre-expanded cover unit forming a part of the sealing system of FIG. 1.

The sealing system 100 can be used to form a sealing assembly 10 to seal an interface between an elongate member, such as an electrical cable 50, and the fitting 110 to form a part of a coupling assembly 15, as shown in FIGS. 3 and 4. The sealing assembly 10 includes the cover sleeve 140 (deployed from the holdout 150), the sealants 130, 132, and portions of the fitting 110. The cover sleeve 140 may be deployed and mounted on the intended substrate(s) in a retracted state or position as shown in FIGS. 3 and 4 and discussed in more detail below. According to some embodiments, the cover sleeve 140 is a cold shrink cover, meaning that it can be shrunk or retracted about the substrate(s) without requiring the use of applied heat.

Figure 2:
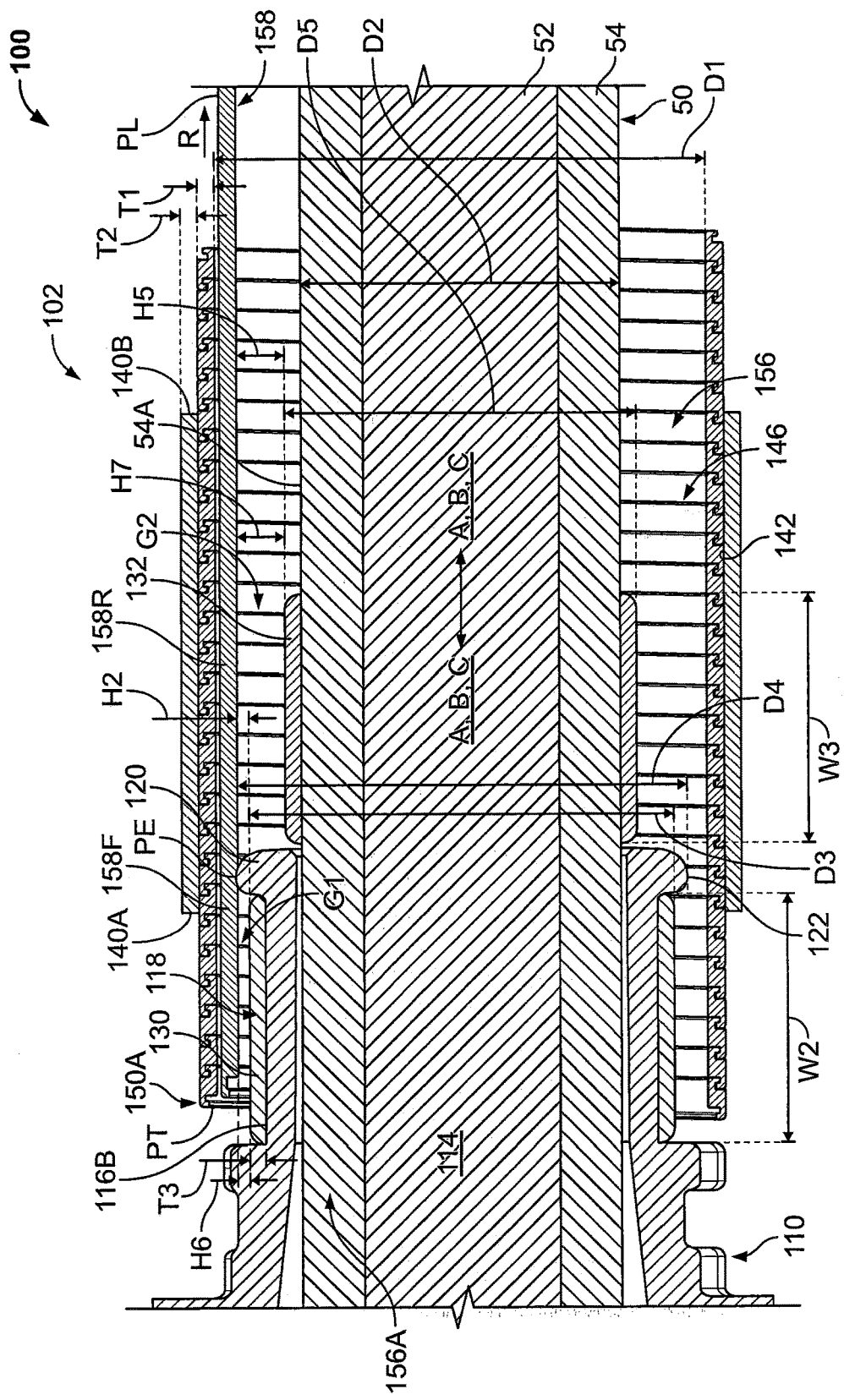
FIG. 2 is a cross-sectional view of the sealing system of FIG. 1 taken along the line 2-2 of FIG. 1.

According to some embodiments, the elongate member 50 is an electrical cable including an electrical conductor 52 surrounded by a concentric outer electrically insulating jacket 54. The jacket 54 has an exposed outer surface 54A (FIG. 2). The cable 50 has a longitudinal axis C-C. In some embodiments, the jacket 54 is formed of a flexible polymeric material. In some embodiments, the cable 50 includes additional layers such as an electromagnetic shield layer, a polymeric insulation layer, and/or a semiconductor layer. For example, the cable 50 may be a jacketed concentric neutral cable, or a polymeric insulated cable that is metal tape shielded or longitudinally corrugated (LC) metal shielded. The cable 50 may be an electrical power transmission cable such as a medium-voltage (e.g., between about 5 and 35 kV) or high-voltage (e.g., between about 46 and 230 kV) power transmission cable.

The coupler fitting 110 (FIG. 5) has a longitudinal axis B-B and includes a body 112 defining a longitudinal, axial bore 114 communicating with opposed end openings 114A, 114B. An annular coupling flange 115 projects radially outwardly from the body 112 adjacent the opening 114A and may be used to secure the fitting 110 to a cooperating coupler member, connector, panel, or bulkhead, for example. An integral, tubular sealing or extension section 116 extends axially to a trailing end 116A at or proximate the end opening 114B. The section 116 has a cylindrical outer surface 116B. An annular groove 118 is defined in the section 116.

The coupler fitting 110 further includes an integral guide projection or guide feature 120 in the form of an integral, annular guide step, rib, protrusion, barb, lip or flange (hereinafter, the guide flange 120). The guide flange 120 projects radially outwardly from the section 116 and has an outer flange surface 122. In some embodiments, the height H1 (FIG. 4) of the upstanding guide flange 120 over the outer surface 116B is at least 0.25 inch and, in some embodiments, is in the range of from about 0.063 to 0.5 inch. According to some embodiments, the width W1 (FIG. 4) of the flange 120 is at least 0.5 inch and, in some embodiments, is in the range of from about 0.03 to 1 inch.

In some embodiments and as shown, the outer surface 122 is rounded or arcuate in axial profile. According to some embodiments, the profile of the outer surface 122 has as arc radius in the range of from about 0.01 to 0.75 inch. In some embodiments, the guide flange 120 is monolithic with section 116 and, in some embodiments, is monolithic with the flange 115 and the section 116. In some embodiments and as shown, the outer surface 122 is substantially smooth.

The guide flange 120 may be formed of any suitable material, such as a rigid or semi-rigid metal or polymeric material. According to some embodiments, the guide flange 120 is formed of a substantially rigid material. According to some embodiments, the guide flange 120 is formed of a material having a hardness of at least 10 Shore A and, in some embodiments, at least 60 Rockwell B.

According to some embodiments, the guide flange 120 is integrally formed with the section 116 (e.g., by molding or machining). In some embodiments, the guide flange 120 is separately formed and then affixed to the section 116 (e.g., by bonding).

The remainder of the coupler fitting 110 may likewise be formed of any suitable material, such as a metal or polymeric material.

The holdout 150 may be commonly referred to as a spiral holdout or core. The holdout 150 (FIGS. 2 and 6) includes a tubular, cylindrical member or body 151. The holdout body 151 has a longitudinal axis A-A and opposed ends 150A, 150B. The holdout body 151 has an inner surface 154 defining a through passage or bore 156 communicating with opposed end openings 156A, 156B.

The holdout 150 includes a continuous, flexible ribbon or strip 152 helically wound to form a series of looped strip segments 152A. The segments 152A are releasably or detachably joined to the respective adjacent segments 152A along their edges to thereby form or constitute the body 151 in the form of a rigid, tubular cylinder. For example, the segments 152A may be joined by continuously interlocked integral tongue and groove features (e.g., as shown in FIG. 2), fusing or welding, or a continuous helical score or tear line. Examples of suitable holdouts may include holdouts as disclosed in U.S. Pat. No. 5,925,427 to Sadlo et al., U.S. Pat. No. 5,944,929 to Vallauri et al. and U.S. Pat. No. 5,670,223 to Sadlo et al. According to some embodiments, the strip 152 has a thickness T1 (FIG. 2) in the range of from about 0.03 to 0.188 inch.

The strip 152 further includes a pull cord or rip cord segment 158 that is routed to extend through the passage 156 as illustrated, for example. The rip cord 158 is a continuation of the portions of the strip 152 forming the body 151. In use, the rip cord 158 can be pulled in a direction R, thereby consecutively stripping the endmost strip segment 152A from the end 150A, whereupon the stripped segment 152A becomes a part of the rip cord 158. In this way, the holdout body 151 can be unraveled and collapsed.

The holdout 150 can be formed of any suitable material. According to some embodiments, the holdout 150 is formed of a semi-rigid polymeric material. According to some embodiments, the holdout 150 is formed of high density polyethylene (HDPE), low density polyethylene (LDPE), polypropylene, ABS, or PVC.

The cover sleeve 140 has an inner surface 142 and opposed ends 140A, 140B. The cover sleeve 140 is tubular and defines an axially extending conductor through passage 146 that communicates with opposed end openings at the ends 140A, 140B.

The cover sleeve 140 can be formed of any suitable material. According to some embodiments, the cover sleeve 140 is formed of an electrically insulative material. According to some embodiments, the cover sleeve 140 is formed of an elastically expandable material. According to some embodiments, the cover sleeve 140 is formed of an elastomeric material. According to some embodiments, the cover sleeve 140 is formed of ethylene propylene diene monomer (EPDM) rubber. Other suitable materials may include neoprene or other rubber. According to some embodiments, the cover sleeve 140 has a Modulus at 100 percent elongation (M100) in the range of from about 0.6 to 1.1 MPa.

According to some embodiments, the thickness T2 (FIG. 2) of the cover sleeve 140 is in the range of from about 0.03 to 0.5 inch. According to some embodiments, the length of the cover sleeve 140 is in the range of from about 1 inch to 24 inches.

According to some embodiments, the cover sleeve 140 is unitarily molded. In some embodiments, the cover sleeve 140 is monolithic. The holdout device 150 may be factory installed in the sleeve 140.

When mounted on the holdout 150, the cover sleeve 140 is maintained in an elastically radially expanded state or position. According to some embodiment, in the expanded state the cover sleeve 140 is expanded in the range of from about 200 to 400 percent of its relaxed diameter (i.e., not on a substrate). As a result, the cover sleeve 140 of the pre-expanded unit 102 will exert a radially compressive pressure or load on the holdout 150.

The sealant 130 may be a mass of any suitable sealant. According to some embodiments, the sealant 130 is a flowable, conformable medium. According to some embodiments, the sealant is a mastic and, in some embodiments, a conformable, flowable, electrically insulative mastic. In some embodiments, the mastic is a rubber-based mastic. Examples of suitable mastics may include S1278 available from TE Connectivity.

The sealant 132 may be a mass of any suitable sealant, and may be the same as or different from the sealant 130. According to some embodiments, the sealant 132 is a flowable, conformable medium. According to some embodiments, the sealant is a mastic and, in some embodiments, a conformable, flowable, electrically insulative mastic. In some embodiments, the mastic is a rubber-based mastic. Examples of suitable mastics may include S1278 available from TE Connectivity.

Hereinbelow, the sealants 130, 132 are referred to as mastics. However, it will be appreciated that in other embodiments, the sealants 130, 132 can be other types of sealant than mastics, as discussed below.

The sealing assembly 10 may be formed and the cover sleeve 140 may be installed as follows.

The pre-expanded cover unit 102 is slid over the cable 50. The inside diameter D1 (FIG. 2) of the holdout 150 is greater than the outer diameter D2 of the cable 50 so that the holdout 150 can be slid onto the cable 50 without undue effort. The pre-expanded unit 102 may be retained or parked on the cable 50 until the operator is ready to install the cover sleeve 140 on the cable 50 and fitting 110.

The cable 50 is inserted into bore 114 of the fitting 110 and may be secured or strain relieved to the fitting 110 as desired. The cable 50 enters the fitting 110 at an interface or joint 105.

The mastic 130 is mounted in the groove 118 to form a tubular, generally cylindrical mass of the mastic 130 surrounding the outer surface 116B as shown in FIGS. 1 and 2. The mastic 130 may be provided as a tape or strip(s) of mastic that are wrapped circumferentially about the extension section 116.

With reference to FIG. 2, the mastic 130 is applied (by building up or as a result of pre-sized thickness) to an outer diameter D3 less than the outer diameter D4 of the guide flange 120 so that there is a nominal radial spacing distance H2 defined between the mastic outer diameter D3 and the guide flange outer diameter D4. According to some embodiments, the spacing distance H2 is at least 0.03 inch and, in some embodiments, the spacing distance H2 is at least 0.125 inch. In some embodiments, the spacing distance H2 is in the range of from about 0.03 to 0.5 inch.

The mastic 130 may abut the guide flange 120 and may extend the full width of the groove 118. According to some embodiments, the mastic layer 130 has a thickness T3 (FIG. 2) in the range of from about 0.03 to 0.25 inch. According to some embodiments, the mastic layer 130 has a width W2 (FIG. 2) in the range of from about 0.5 to 3 inches.

The mastic 132 is mounted about the cable jacket 54 adjacent the end 116A to form a tubular, generally cylindrical mass of the mastic 130 surrounding the jacket 54 as shown in FIG. 2. The mastic 132 may be provided as a tape or strip(s) of mastic that are wrapped circumferentially about the cable 50.

The mastic 132 is applied (by building up or as a result of pre-sized thickness) to an outer diameter D5 (FIG. 2) less than the outer diameter D4 of the guide flange 120 so that there is a nominal radial spacing distance H5 (FIG. 2) defined between the mastic outer diameter D5 and the guide flange outer diameter D4. According to some embodiments, the spacing distance H5 is at least 0.03 inch and, in some embodiments, the spacing distance H5 is at least 0.5 inch. In some embodiments, the spacing distance H5 is in the range of from about 0.03 to 1 inch.

The mastic 132 may abut end 116A of the fitting 110 or be spaced apart therefrom. According to some embodiments, the mastic layer 130 has a thickness in the range of from about 0.03 to 0.5 inch. According to some embodiments, the mastic layer 132 has a width W3 (FIG. 2) in the range of from about 0.5 to 3 inches.

The pre-expanded unit 102 is then slid into position over the fitting 110. The inside diameter D1 of the holdout 150 is greater than the outer diameter D4 of the guide flange 120 combined with the thickness T1 of the rip cord 158 so that the holdout 150 can be slid onto the fitting 110 without undue effort.

The holdout 150 is then removed from the cover assembly 100, thereby permitting the elastomeric sleeve 140 to relax and radially retract about the cable 50, the mastic 130, the mastic 132 and the fitting 110 as shown in FIGS. 3 and 4, as discussed in more detail below. The holdout 150 is removed by pulling the rip cord 158 in the direction R through the passage 156, causing the strip 152 to incrementally unravel from the end 150A. As a result, the sleeve 140 is permitted to axially progressively contract (radially) from the end 140A to the end 140B until the holdout 150 is fully unraveled and removed. The sealing assembly 10 is thus formed. As can be seen in FIG. 3, the mastic 130 is radially interposed between the extension section 116 and the cover sleeve 140 and engages or contacts the fitting surface 116B and the sleeve inner surface 142. The mastic 132 is radially interposed between the cable 50 and the cover sleeve 140 and engages or contacts the cable surface 54A and the sleeve inner surface 142.

The relaxed inner diameter of the cover sleeve 140 is less than at least the outer diameter of the jacket layer 54. Therefore, the outer sleeve 140 exerts a persistent radially inwardly compressive load, pressure or clamping force (due to elastic tension) onto the cable 50, the mastic 130, the mastic 132, and the fitting 110. According to some embodiments, the relaxed inner diameter of the cover sleeve 140 is at least 10% less than the smallest diameter cable upon which the cover sleeve 140 is intended to be installed. The cover sleeve 140 may thereby effect an environmental seal (in some embodiments, a liquid tight seal) at the interface between the cover sleeve 140 and the cable jacket 54 and at the interface between the outer sleeve 140 and the extension section 116. The adhesive properties of the mastics 130, 132 may contribute to the seals. The mastics 130, 132 may tend to conform to the adjacent components and flow into and fill discontinuities in the coupling assembly 15. These seals can protect the cable and the joint or assembly from the ingress of environmental contaminants such as moisture.

During installation, the guide flange 120 serves to guide, route and/or constrain the rip cord 158 to prevent or inhibit the rip cord 158 from engaging the mastic 130 and the mastic 132. As illustrated in FIG. 1 (which is cutaway for the purpose of explanation) and FIG. 2, the guide flange 120 lifts or supports the rip cord 158 at an intermediate location within the holdout 150 and adjacent the mastic 130 to thereby maintain a spacing or gap G1 between the rip cord 158 and the mastic 130. Similarly, the guide flange 120 thereby maintains a spacing or gap G2 between the rip cord 158 and the mastic 132. According to some embodiments, the height 146 of the gap G1 and the height H7 of the gap G2 are each at least 0.03 inch and, in some embodiments, at least 1 inch. The rip cord 158 may slide across and circumferentially translate along the guide flange 120 as the rip cord 158 helically unravels from the end 150A and is withdrawn.

More particularly, the guide flange 120 engages the rip cord 158 at an engagement point PE. A front section 158F of the rip cord 158 extends from the engagement point PE to a takeoff point PT at the end 150A of the holdout body 151. A rear section 158R of the rip cord 158 extends from the engagement point PE to a leading point PL at or beyond the end 150B. The front section 158F is thus supported by the body 151 and the guide flange 120, and the rear section 158R is supported by the installer's hand and the guide flange 120. Tension in the pulled rip cord 158 and/or the inherent stiffness of the rip cord 158 may prevent the sections 158F, 158R from sagging or otherwise coming into contact with the underlying mastics 130, 132.

Thus, the guide flange 120 serves as a designed-in or integral feature or solution for protecting the mastics 130, 132 from undesirable contact with and damage from the rip cord 158. For example, the guide flange 120 can prevent the rip cord 158 from dragging against the mastics 130, 132 during installation, which dragging may remove mastic from the surface of the fitting or cable and thereby compromise the seal. The sealing system 100 can eliminate or reduce the need for solutions of the prior art such as protective vinyl electrical tape.

Moreover, the guide flange 120, as well as the opposing wall of the groove 118, can serve to retain the mastic 130 in place. The guide flange 120 and groove 118 can also serve to designate the bounds for placement of mastic 130.

The guide flange 120 can also serve as a retaining barb or retention feature that engages the cover sleeve 140 and mechanically resists axial displacement of the cover sleeve 140 relative to the section 116 of the fitting 110. The outer surface 122 of the guide flange 120 has sufficient radii to enable smooth transition of the cover sleeve 140.

Figure 7:
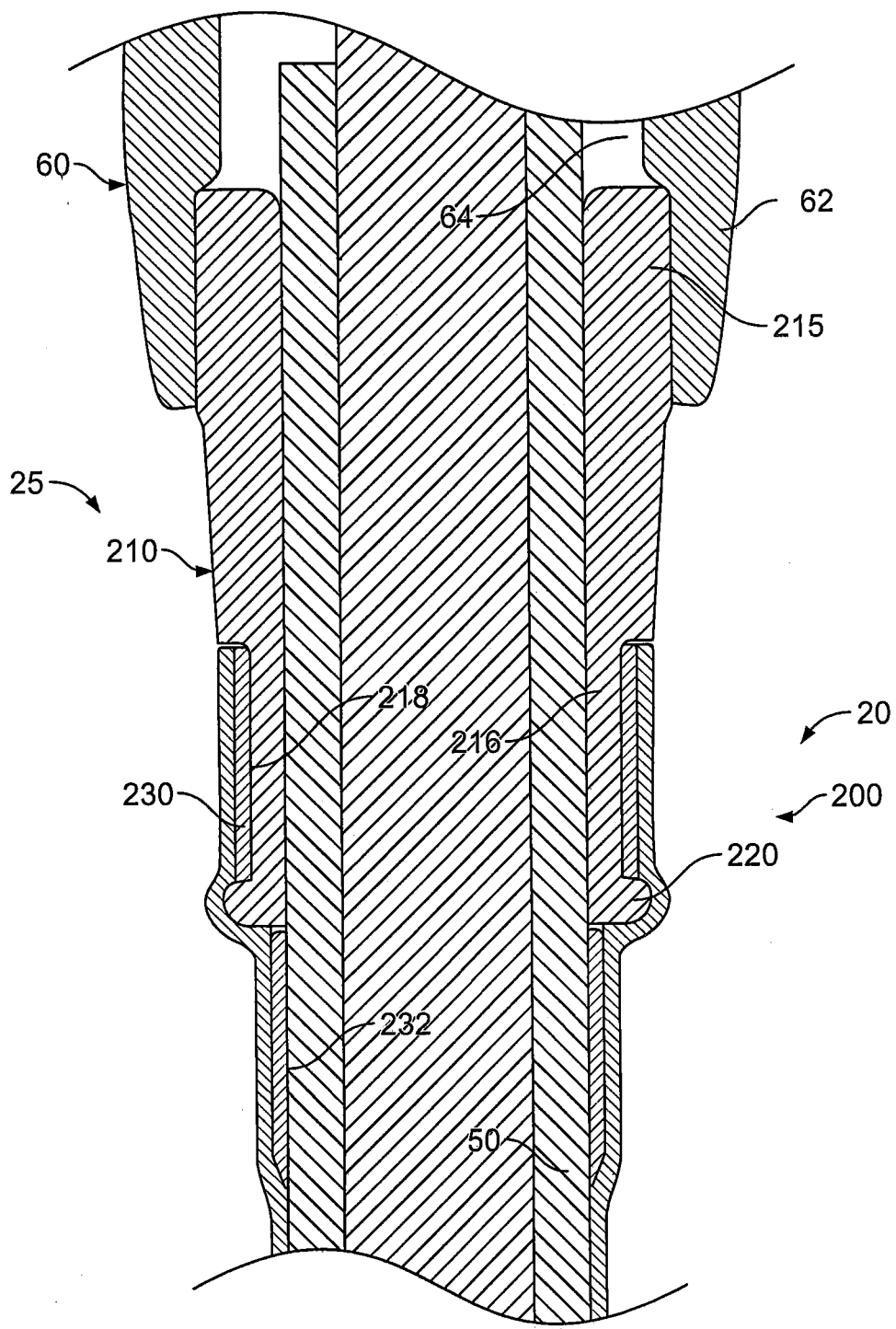
FIG. 7 is a cross-sectional view of a joint assembly including a sealing system according to further embodiments of the invention.

With reference to FIG. 7, a sealing assembly 20 according to further embodiments is shown therein. The sealing assembly 20 is constructed or installed using a sealing system 200 including the pre-expanded cover unit 102 (FIG. 6), a sealant 230, a sealant 232, and a cable adapter 210. In the illustrated embodiment, the sealing system 200 is installed on an elbow joint body 60 and a cable 50, which collectively form a joint assembly 25.

The sealants 230, 232 may be mastics or other sealants as discussed above with regard to the sealants 130, 132.

The elbow joint body 60 includes a tubular leg 62 defining a cable receiving bore 64. Typically, the leg 62 is elastomeric.

The cable adapter 210 is a tubular, elastomeric member defining a through bore 214 configured to receive an end section of the cable 50. The cable adapter 210 includes a front section 215 that is received in the bore 64 and may serve to more closely and/or consistently fit the cable 50 to the elbow 60 and/or seal the interface between the cable 50 and the elbow 60. The cable adapter 210 further includes a tubular extension section 216 that extends outwardly beyond the leg 62 and is fitted about the cable 50. The cable adapter 210 may provide a more progressive step down from the outer diameter of the elbow body 60 to the outer diameter of the cable 50. The construction and use of cable adapters in this regard is well-known and will not be discussed in detail herein.

The cable adapter 210 is further provided with an integral, annular guide flange 220 corresponding to the guide flange 120 on the extension section 216. The guide flange 220 may be integrally or unitarily molded with the extension section 216 or affixed thereto. In some embodiments, the guide flange 220 is integrally formed with the extension section 216 and formed of elastomeric material.

The extension section 216 may include an annular groove 218 corresponding to the groove 118 to contain the mastic 230.

The sealing system 200 can be installed in substantially the same manner as described above for the sealing system 100. The mastic 230 is wrapped about the extension section 216 and the mastic 232 is wrapped about the cable 50 adjacent the terminal end of the section 216. The holdout 150 is then unraveled using the rip cord 158 to release the cover sleeve 100 onto the mastic 230 and the cable adapter 210. In doing so, the rip cord 158 is guided by the guide flange 220 to prevent or inhibit the rip cord 158 from contacting or dragging along the mastics 230, 232.

While inventive sealing systems have been described hereinabove in combination with a coupler fitting and a cable adapter, a guide flange and other features according to embodiments of the invention can similarly be used with and incorporated into substrates of other types such as accessories, joints and splices for power transmission cables. The inventive sealing systems can also be used to seal other types of elongate objects, such as pipes and conduits.

According to further embodiments, the sealant layers 130, 132 may be of a type other than mastic. Other sealants may include gels (in some embodiments, a silicone gel) and greases.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A sealing system for forming an environmentally sealed joint with an elongate member, the sealing system comprising:
   a tubular substrate including an integral, radially outwardly projecting, annular guide flange and defining a substrate bore to receive a portion of the elongate member;
   a pre-expanded cover unit including:
      a holdout including a helically wound strip, the strip forming a tubular holdout body and a rip cord, the holdout body defining a holdout passage extending axially therethrough; and
      a tubular cover sleeve mounted on the holdout body, wherein the holdout maintains the cover sleeve in a radially elastically expanded state; and
   wherein, with:
      the elongate member positioned with a portion of the elongate member extending from the tubular substrate,
      a primary sealant layer mounted on an outer surface of the tubular substrate, and
      a secondary sealant layer mounted on an outer surface of the elongate member,
   the pre-expanded cover unit is configured to be mounted around the primary sealant layer and the secondary sealant layer, and the holdout is configured to then be removed from the cover sleeve by withdrawing the rip cord through the holdout passage between the primary sealant layer and the holdout body and between the secondary sealant layer and the holdout body to remove the holdout body and thereby permit the cover sleeve to radially contract about the tubular substrate and the elongate member;
   wherein the guide flange projects outwardly beyond an outer surface of the primary sealant layer, and an inner diameter of the holdout passage is greater than an outer diameter of the guide flange combined with a thickness of the rip cord, and the guide flange serves to prevent or inhibit the rip cord from contacting the primary sealant layer and the secondary sealant layer as the rip cord is withdrawn through the holdout passage; and wherein:
the tubular substrate includes an annular second flange axially spaced apart from the guide flange;
the guide flange and the second flange define an annular groove therebetween; and
the primary sealant layer is disposed in the groove.

2. The sealing system of claim 1 wherein the elongate member is an electrical cable.

3. The sealing system of claim 2 wherein the electrical cable includes an electrical conductor surrounded by an electrically insulative jacket.

4. The sealing system of claim 1 wherein the guide flange has a guide flange height from the outer surface of the tubular substrate to the outer diameter of the guide flange of at least 0.25 inch.

5. The sealing system of claim 1 wherein
a nominal spacing is defined between an outer surface of at least one of the primary and secondary sealant layers and the outer diameter of the guide flange of at least 0.125 inch.

6. The sealing system of claim 1 wherein the guide flange has a rounded axial profile.

7. The sealing system of claim 1 wherein the guide flange is formed of a rigid material.

8. The sealing system of claim 1 wherein at least one of the primary and secondary sealant layers includes a flowable, electrically insulative mastic.

9. The sealing system of claim 8 wherein at least one of the primary and secondary sealant layers includes a rubber-based mastic.

10. The sealing system of claim 1 wherein the cover sleeve is formed of an elastomeric material.

11. The sealing system of claim 1 wherein the cover sleeve is formed of ethylene propylene diene monomer (EPDM) rubber.

12. The sealing system of claim 1 wherein the tubular substrate is a coupler fitting for use in an electrical connector coupling assembly, and includes:
a tubular body;
an annular coupling flange projecting radially outwardly from the body;
a tubular extension section projecting axially from the body; and
an axial bore extending through the body and the extension section.

13. The sealing system of claim 1 wherein the guide flange is continuous and circumferentially endless.

* * * * *